United States Patent [19]
Peters

[11] Patent Number: 5,933,775
[45] Date of Patent: Aug. 3, 1999

[54] MECHANISM FOR PROVIDING WIRELESS AUDIO AND CONTROL CHANNELS FOR PERSONAL COMPUTER INTERACTIVE PHONE (PCIP) SYSTEM

[75] Inventor: Daniel V. Peters, Lisle, Ill.

[73] Assignee: NCR Corporation, Dayton, Ohio

[21] Appl. No.: 08/767,045

[22] Filed: Dec. 16, 1996

[51] Int. Cl.⁶ .............................. H04M 3/00; H04B 1/38
[52] U.S. Cl. ...................... 455/420; 455/557; 379/167
[58] Field of Search .................................. 379/356, 354, 379/355, 88.21, 350, 167, 426; 455/419, 420, 422, 557

[56] References Cited

U.S. PATENT DOCUMENTS

| | | | |
|---|---|---|---|
| 4,578,540 | 3/1986 | Borg et al. .............................. | 179/2 A |
| 5,127,045 | 6/1992 | Cragun et al. ......................... | 379/67.1 |
| 5,165,095 | 11/1992 | Borcherding .............................. | 379/88 |
| 5,325,421 | 6/1994 | Hou et al. .................................. | 379/67 |
| 5,327,486 | 7/1994 | Wolff et al. ........................... | 379/93.24 |
| 5,353,331 | 10/1994 | Emery et al. ............................ | 455/461 |
| 5,394,445 | 2/1995 | Ball et al. .................................. | 379/67 |
| 5,400,327 | 3/1995 | Dezonno .................................. | 370/271 |
| 5,440,627 | 8/1995 | Puri ......................................... | 379/355 |
| 5,563,939 | 10/1996 | La Porta et al. ......................... | 379/220 |
| 5,598,412 | 1/1997 | Griffith et al. ........................... | 370/352 |
| 5,608,780 | 3/1997 | Gerszberg et al. ...................... | 455/436 |
| 5,623,537 | 4/1997 | Ensor et al. ............................. | 379/88.2 |
| 5,734,699 | 3/1998 | Lu et al. .................................. | 455/422 |
| 5,802,467 | 9/1998 | Salazar et al. ........................... | 455/420 |

*Primary Examiner*—Nguyen Vo
*Assistant Examiner*—Charles N. Appiah
*Attorney, Agent, or Firm*—Ying Tuo

[57] ABSTRACT

An interface circuit provides a wireless channel and a line channel to a telephone set. The wireless channel is coupled to a controller (e.g. a PC) and to another telephone set, and the line channel is coupled to a telephone network. A switch circuit connects the telephone set to the wireless channel to transmit a signal between the telephone set and the controller (or another telephone set). The switch circuit connects the telephone set to the line channel to transmit a signal between the telephone set and the telephone network.

4 Claims, 9 Drawing Sheets

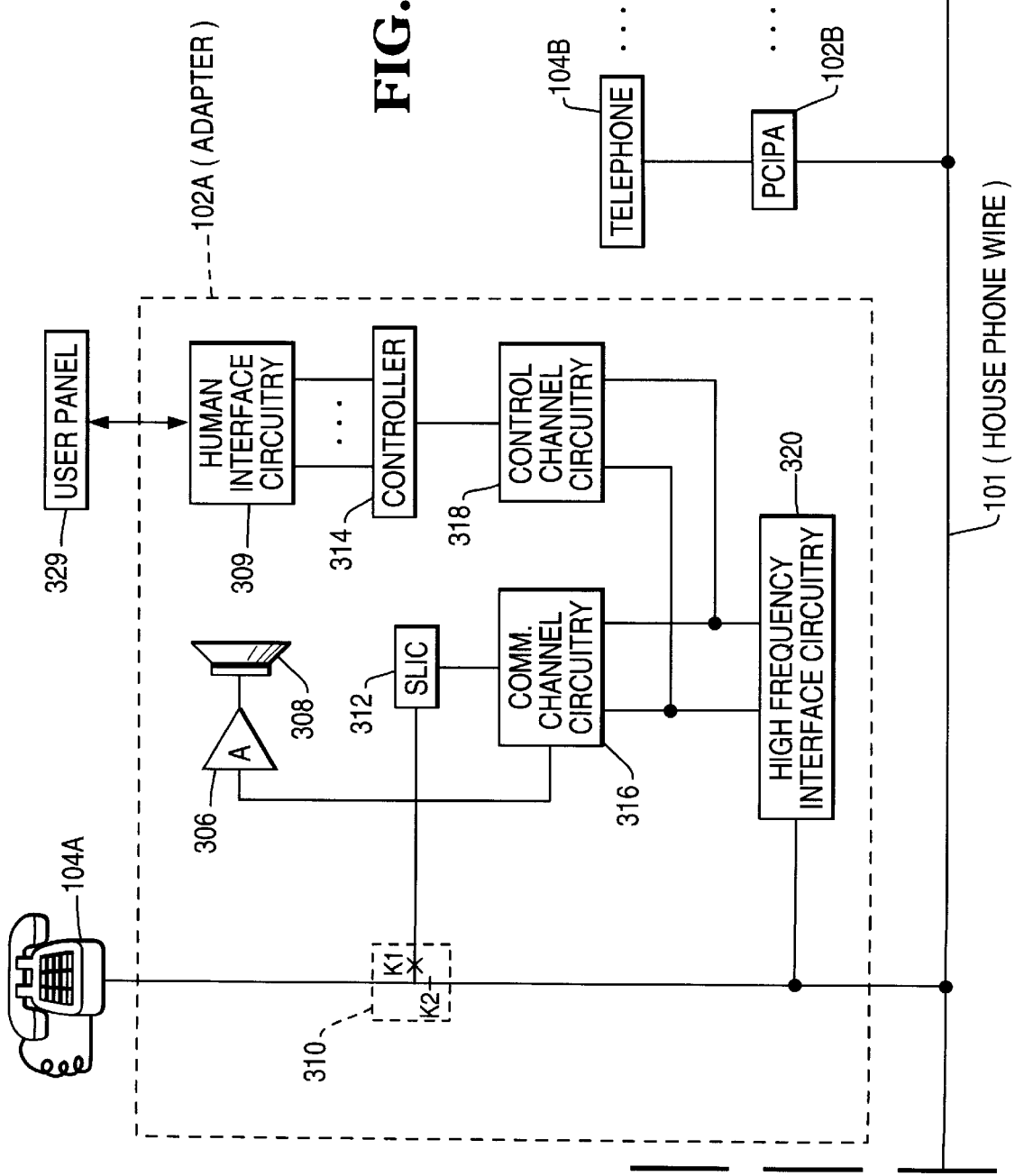

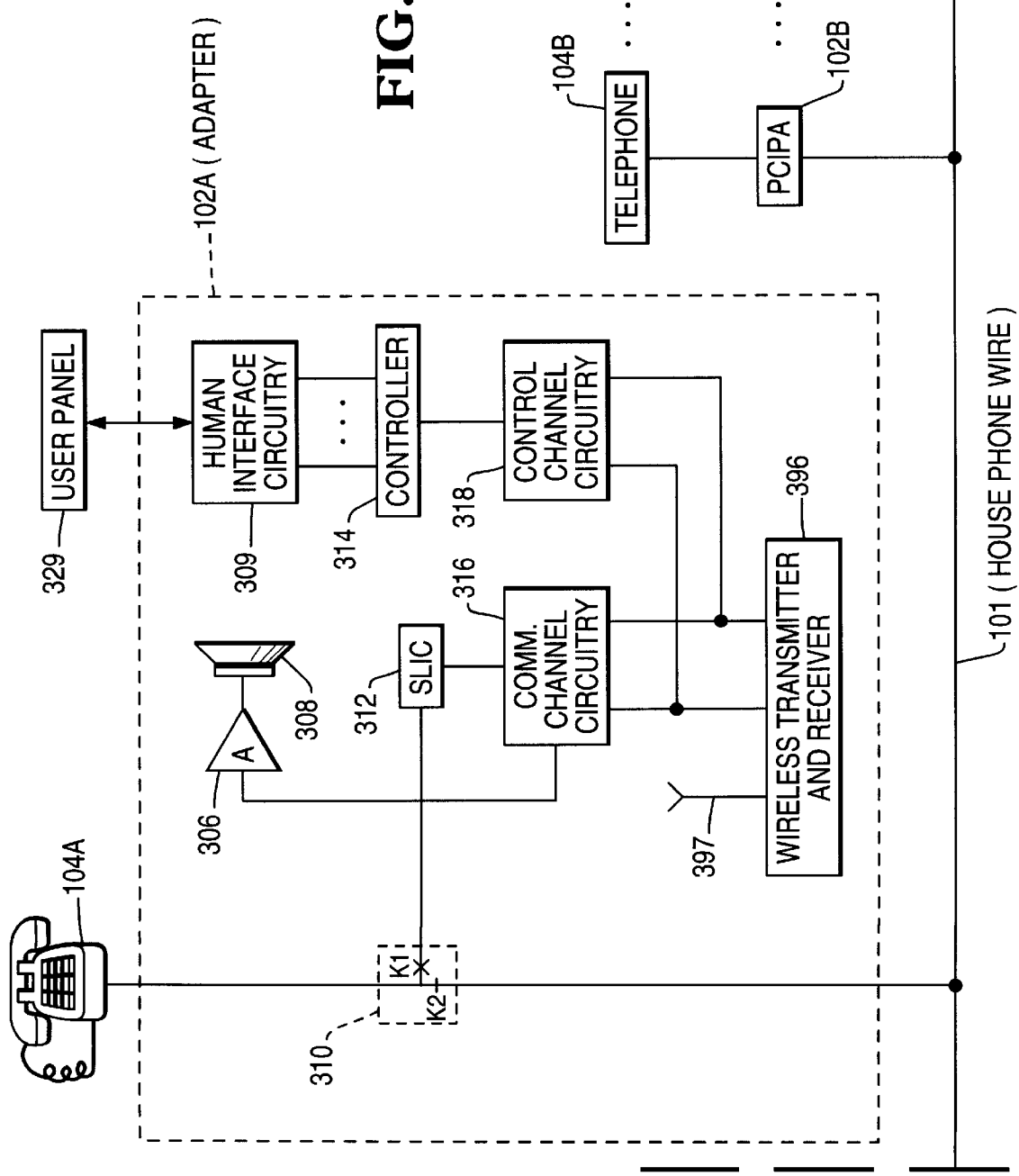

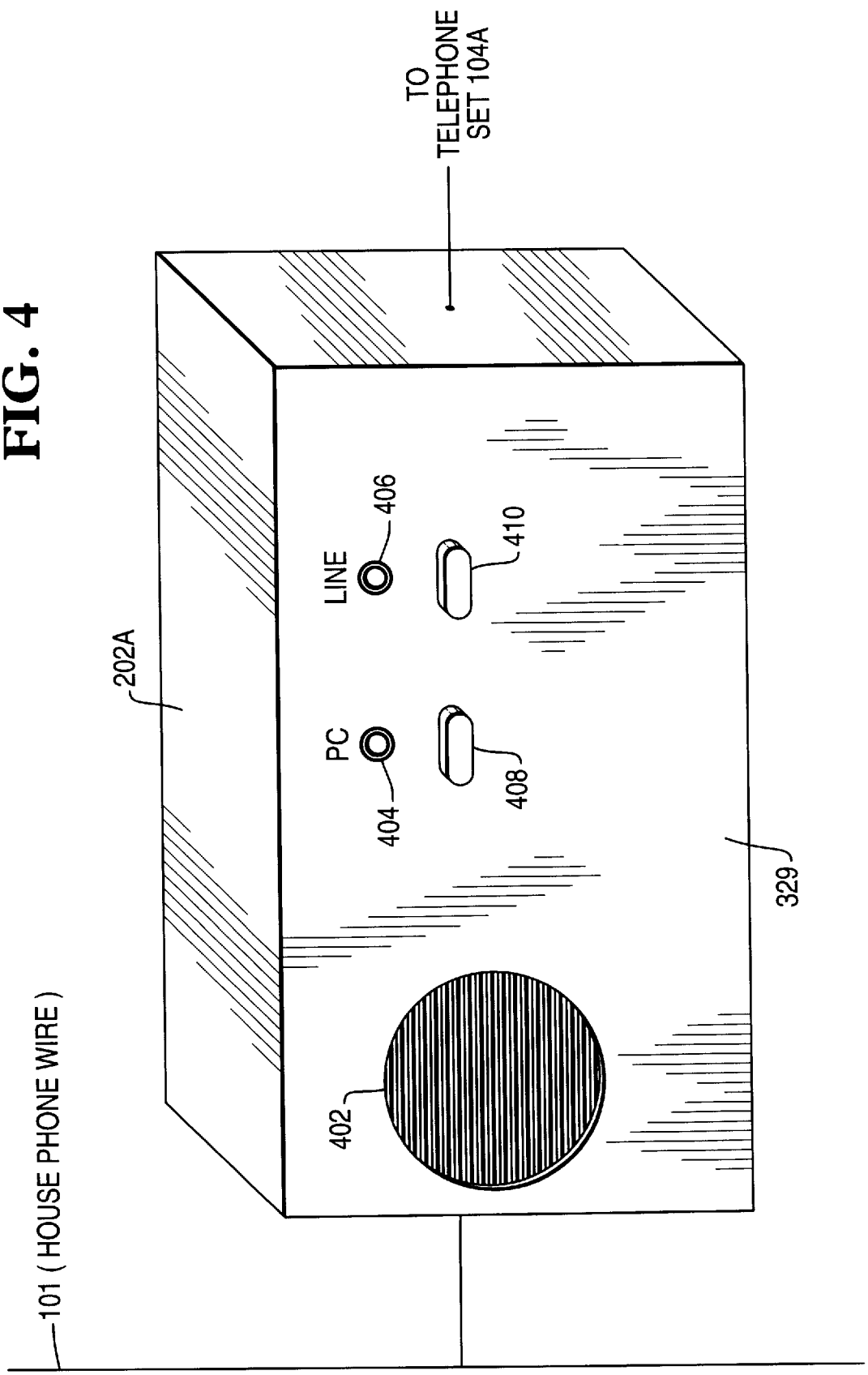

MECHANISM FOR PROVIDING WIRELESS AUDIO AND CONTROL CHANNELS FOR PERSONAL COMPUTER INTERACTIVE PHONE (PCIP) SYSTEM

BACKGROUND OF THE INVENTION

The present invention generally relates to a telephone communication system, and in particular, to an in-home (or a small office) telephone communication system utilizing the capabilities in existing telephone equipment and existing phone wiring with the addition of a control computer.

Increasingly, many homes may have one or more telephone wires and a modern PC with advanced features. With increasing performance needs and expectations on home telephone system, more and more consumers are demanding that the home telephone system have more intelligence and processing capabilities at an affordable price. Thus, applicant has realized there is a large market potential to use modern PC's processing power to provide home telephone system with advanced home telephony features, including:

(1) caller ID announcement based on caller ID record, (2) voice activated auto-dial, (3) PC resident message center access from any PCIP equipped phone, (4) routing of incoming calls to specific phones in the home, (5) in-house intercom with no additional wiring of the home, (6) screening of incoming messages from any PCIP equipped phone, (7) home convenience package including list maker and scheduler, and (8) speech recognition by using the PCIP system.

Applicant has also realized that the feasibility to achieve such market potential greatly relies on an effective design of an integrated computer-telephone system:

(1) that has a low cost, (2) that is flexible to form a specific telephone system for a household, (3) that is adaptable to existing telecommunication technology, (4) that is adaptable to consumer's existing telephone equipment and house wiring, (5) that is simple to install, and (6) that does not interfere with regular operation of existing home telephone system.

Applicant has further realized that the performance of the integrated computer-telephone system greatly depends on a design that can effectively link a control computer (typically a personal computer) with a plurality of telephone sets that are connected to a telephone line (or a communication channel), and that can effectively link any two of the telephone sets.

This application specifically relates to a wireless link that provides an audio channel and a control channel between the control computer and the telephone sets. The other features of the present invention are described in U.S. application Ser. Nos. 08/766,120, 08/766,121, 08/766,122, 08/766,123, 08/767,043, 08/767,044, and 08/767,046, which are incorporated into this application by reference.

Therefore, there is a need to provide a method and apparatus for linking a computer with a plurality of telephone sets that are connected a telephone line (or a communication channel), and for linking any two of the telephone sets, with the advanced features and advantages above mentioned.

The present invention meets this need.

SUMMARY OF THE INVENTION

In one aspect, the present invention provides an apparatus, coupled to a communication device, for connecting the communication device to a communication line, and for connecting the communication device to a controller. The apparatus comprises:

a wireless communication channel to provide an information path between the communication device and the controller; and a wireless control channel to provide a control path between the communication device and the controller.

In another aspect, the present invention provides an apparatus, coupled to a first communication device, for connecting the first communication device to a communication line, and for connecting the first communication device to a second communication device. The apparatus comprises:

a wireless communication channel to provide an information path between the first communication device and the second communication device; and a wireless control channel to provide a control path between the first communication device and second communication device.

The present invention also provides the respective methods corresponding to the two aspects mentioned above.

BRIEF DESCRIPTION OF THE DRAWING

The above and other features, and advantages of the present invention will become apparent from the following description and attached drawings, in which:

FIG. 4 shows the user panel of FIG. 3 in greater detail;

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

Figure 1:
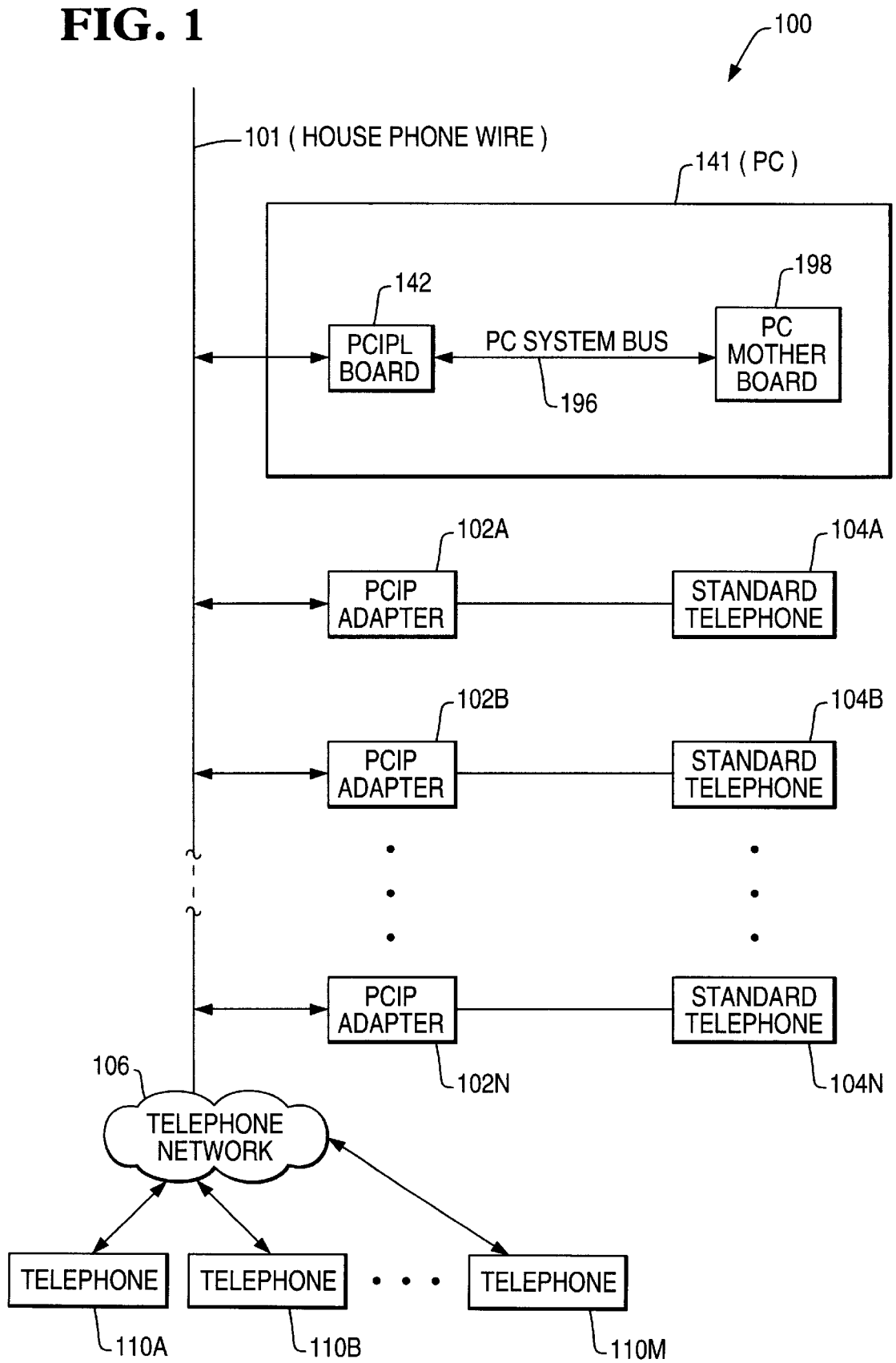
FIG. 1 is a block diagram of a PC interactive phone (PCIP) system, in accordance with the present invention.

Referring to FIG. 1, there is shown a block diagram of a PC interactive phone (PCIP) system, in accordance with the present invention.

The PC interactive phone system includes a house telephone line 101, a PC 141, a plurality of telephone sets (identified as 104A, 104B, . . . , 104N), and a plurality of PCIP adapter (identified as 102A, 102B, . . . , 102N). Each of the telephone sets is coupled to its respective PCIP adapter (PCIPA). These telephone sets can be standard ones without any advanced features. Via telephone network 106, each of telephone sets 104A, 104B, . . . , 104N can communicate with telephone sets 110A, 110B, . . . , or 110M.

As shown in FIG. 1, PC 141 includes a PC mother board 198 and an add-in PCIP link (PCIPL) board 142. Other detailed aspects of a typical PC are not described here because they are known to the people in the art. PCIPL board 142 is coupled to PC mother board 198 via PC system bus 196. An example of a typical modem system bus is the PCI local bus. The PCIPL board and plurality of PCIP adapters are coupled to house telephone line 101.

Figure 2:
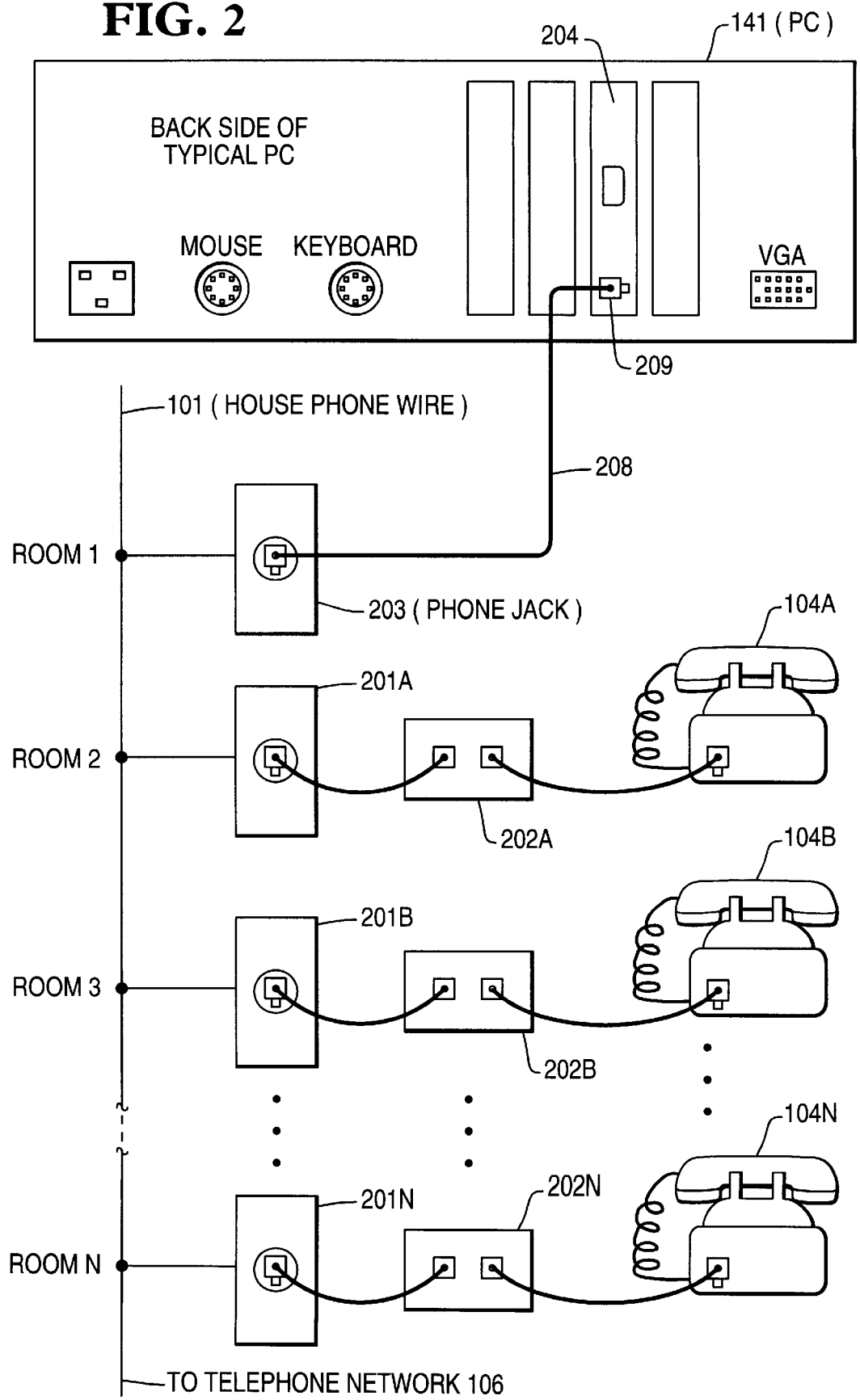
FIG. 2 shows house wiring of a telephone line and installation scheme for the PC interactive phone (PCIP) system shown in FIG. 1, in accordance with the present invention.

Referring to FIG. 2, there is shown house wiring of telephone line 101 and installation scheme for the PC interactive phone (PCIP) system shown in FIG. 1, in accordance with the present invention.

As shown in FIG. 2, PC 141 has a slot 142, generally allowing access for miscellaneous PC add-in boards, into which PCIPL board 142 is inserted. Telephone line 101 is wired into rooms 1–N, where telephone jacks 203, 201A, 201B, . . . , 201N are installed respectively.

Via connector 209 and a connectorized telephone wire 208, PCIPL board 142 is coupled to telephone jack 203.

A plurality of adapter boxes (202A, 202B, . . . , 202N) are coupled to telephone jacks 201A, 201B, . . . , 201N, respectively. The telephone sets (104A, 104B, . . . , 104N) are coupled to adapter boxes 202A, 202B, . . . , 202N, respectively. Installed within adapter boxes 202A, 202B, . . . , 202N are PCIP adapters 102A, 102B, . . . , 102N, respectively. Each of the adapter boxes has a user panel which is depicted in FIG. 4 in greater detail.

To users, the system consists of just a few elements, some of which they would already have. FIG. 2 shows how simply these elements are interconnected.

Referring to FIG. 3A (including 3B and 3C), there is shown an embodiment of the PC interactive phone (PCIP) system of FIG. 1 in greater detail, in accordance with the present invention.

Depicted in FIG. 3B as a representative of the pluralities of PCIP adapters (102A, 102B, . . . , 102N), PCIP adapter 102A includes an amplifier 306, a speaker 308, a human interface circuitry 309, a relay 310, a subscriber loop interface (SLIC) 312, a controller 314, a communication channel circuitry 316, a control channel circuitry 318, and a high frequency interface circuitry 320. Coupled to human interface circuitry 309 is a user panel 329.

Speaker 308, coupled to communication channel circuitry 316 via amplifier 106, is able to project audio to PCIP adapter locations in the home as needed by the PCIP system.

SLIC 312, coupled between communications channel circuitry 316 and telephone 104A via K1 switch located within relay 310, is able to power telephone set 104A, to detect off-hook condition for telephone set 104A, to adjust the proper bias and amplitude to send audio signal to and receive audio signal from telephone set 104A, to adjust the proper bias and amplitude to send audio signal to and receive audio signal from the communications channel circuitry 316, and to convert a 4-wire-send-and-receive signaling arrangement on the communications channel side to a 2-wire-send-and-receive signaling arrangement that is appropriate to a telephone set. The off-hook detect capability within the SLIC is used by the PCIP system to initiate a "listen" response whenever a telephone handset gets picked up. Modem SLIC circuits are highly integrated devices that can be purchased from a number of suppliers.

Relay 310 is able to connect telephone 104A either to the PCIPA circuits, or to the telephone line by bypassing adapter 102A.

Human interface circuitry 309, coupled to controller 314, is able to generate currents to light the LEDs on user panel 329 in response to control signals from controller 314, and to generate service request signals to controller 314 in response to activations of the function buttons on user panel 329.

In adapter 102A, as an embodiment, communication channel circuitry 316, coupled to SLIC 312, can include two high frequency communication channels: a high frequency transmitter and a high frequency receiver. The high frequency transmitter combines low frequency audio from SLIC 312 with a high frequency carrier that can be coupled onto the home telephone wires in a non-interfering manner using the high frequency interface circuitry 320. The high frequency receiver recovers low frequency audio from a high frequency carrier on the house telephone wires and sends it either to SLIC 312 or to speaker 306 and amplifier 308, depending on control signals communicated through the controller 314. The two high frequency communication channels are mainly used as a full duplex audio (e.g., simultaneous audio transmission and reception) channel to another adapter, or to PC 141 (via the two communication channels located within PCIPL board 142). Depending on the various operating modes of the PCIP system, these two frequencies are re-configurable to the either transmitter or receiver functions under control of PCIPA controller 314.

Control channel circuitry 318 can encode and decode binary sequences using a third high frequency carrier (distinct from the two communication channels described in the previous paragraph). The control channel circuit is connected to the controller 314 which facilitates a multi-point network using a single carrier frequency. Controller 314 has a networking port capable of transmitting and receiving Manchester encoded digital information, which eliminates the need for a separate clock signal. Controller 314 also uses a collision sensing and back-off algorithm that resolves contention for the network. The control channel frequency can be coupled onto the house telephone wires in a non-interfering manner using high frequency interface circuitry 320. The encode side of control channel circuit 318 converts a binary "1" and "0" sequence from the controller 314 to a "carrier on" and "carrier off" sequence. The decode side of control channel 318 circuit converts a "carrier on" and "carrier off" sequence to a binary "1" and "0" sequence to be sent to the controller 314.

High frequency interface circuitry 320, which connects communication channel circuitry 316 and control channel circuitry 318 to the telephone line, is able to couple high frequency carrier from circuitries 316 and 318 to telephone line 101, without interfering the normal audio band signal transmission on the telephone line. High frequency interface circuitry 320 can also receive high frequency signals from the telephone line.

Controller 314 is specialized for implementation of distributed sense and control networks. It includes a networking port, a configurable input/output port, and hardware and firmware that allow execution of simple programs for sense and control and communications protocols. The input/output port provides access to human interface circuitry 309 and it controls various communications path options within the PCIPA circuit. For example, the input/output port is able to control the states of relay 310 (energized or un-energized), to generate signals to light the LEDs on user panel 329, to detect a button activation on user panel 329, to monitor the off-hook detect signal from the SLIC, and to switch the communication channel receiver output between speaker amplifier 306 and SLIC 312. The networking port that is integrated into controller 314 allows it to send and receive control commands from PC 141, for example, to send a service request to PC 141 after a specific button on user panel 329 has been activated. Specifically, the controller networks with the PC and other PCIPA controllers using data packets across the control channel. The Manchester encode and decode circuits that generate and sense the "1" and "0" bits are also integrated into the controller. Controller 314 also has a collision detect and back-off algorithm that resolves contention and allows multi-node access to the carrier. The specific device that currently suits this application is a Lon Works Neuron chip, MC143120 available from Motorola and Toshiba.

Figure 3C:
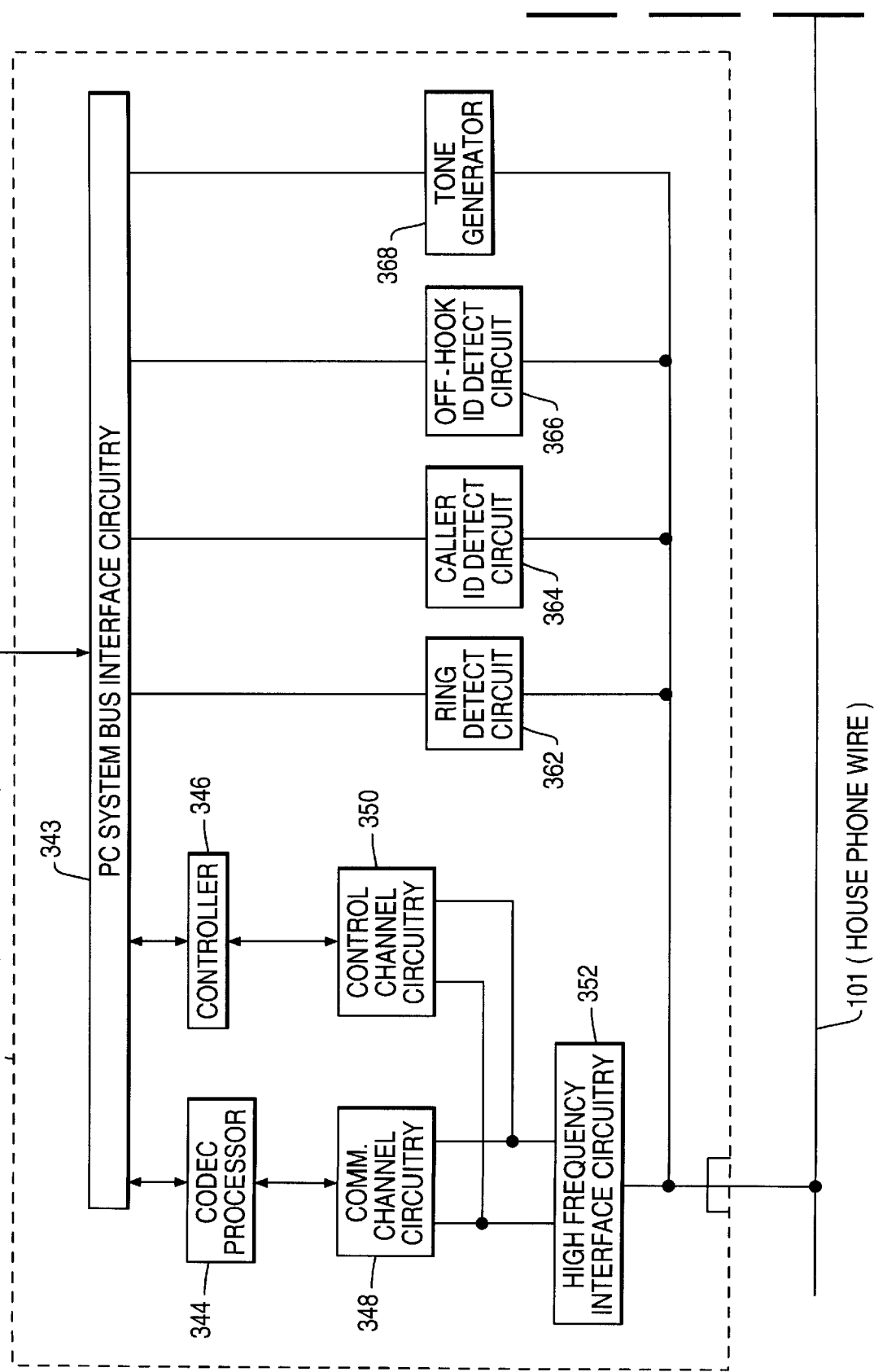
FIG. 3 (including 3A and 3B) shows the PC interactive phone (PCIP) system of FIG. 1 in greater detail, in accordance with the present invention.

As shown in FIG. 3C, PCIPL board 142 includes a PC system bus interface circuitry 343, a CODEC (coder/decoder) processor 344, a controller 346, a communication channel circuitry 348, a control channel circuitry 350, a high frequency interface circuitry 352, a ring detect circuit 362, a Caller ID detect circuitry 364, an off-hook detect circuit 366, and tone generator 368.

PC system bus interface circuitry 343, coupled to PC system bus 196, is able to transmit signals between PC system bus 196 and the other circuitries on PCIPL board 142.

CODEC processor 344, coupled to PC bus system bus interface circuitry 343, is able to convert digitally encoded audio from PC system bus 196 to analog audio and send the converted digital audio to communication channel circuitry 348. It is also able to convert analog audio from communication channel circuitry 348 to digital audio and send the converted analog audio to PC 141.

Controller 346 has similar structure and function as controller 314 described for PCIP adapter 102A. It is specialized for implementation of distributed sense and control networks. It includes a networking port, a configurable input/output port, and hardware and firmware that allow execution of simple programs for sense and control and communications protocols. The input/output port in this case connects to PC system bus interface circuit 343 and provides a parallel port for communicating with the PC circuit. The controller 346 is coupled between PC system bus interface circuitry 343 and control channel circuitry 350, and is thus able to provide network access for the PC to generate control commands to, and interpret service requests and operational reports from, the adapters (102A, 102B, ..., 102N).

On PCIPL board 142, communication channel circuitry 348 has two high frequency communication channels, which are mainly used to flexibly establish full duplex audio channels between CODEC processor 344 and the PCIP adapters (102A, 102B, ..., 102N). Only one PCIP adapter will be allowed to transmit on either of the two communication channels at any time as controlled by PCIP control program 602. The function and structure of communication channel circuitry 348 are similar to those of communication channel 316 in the above-described PCIP adapter 102A.

Control channel circuitry 350 has one channel, which is mainly used to send control commands to, and receive service requests and operational reports from, the adapters (102A, 102B, ..., 102N). The function and structure of control channel circuitry 350 are similar to those of control channel circuitry 318 in the above-described PCIP adapter 102A.

High frequency interface circuitry 352, which connects communication channel circuitry 348 and control channel circuitry 350 to telephone line 101, is able to couple the high frequency carrier from circuitries 348 and 350 to the telephone line, without interfering with the normal audio band signal transmission on the telephone line. High frequency interface circuitry 352 can also receive high frequency signals from the telephone line.

Ring detect circuit 362 is able to detect ring currents on the telephone line.

Caller ID detect circuit 364 is able to detect caller's identification information (minimally, a caller's telephone number). This information is carried between first and second ring currents of an incoming call when caller ID service has been purchased from the local phone company.

Off-hook detect circuit 366 is able to detect a change in line impedance associated with off-hook condition. Three examples of off-hook condition are:

1. any of the non-PCIP equipped telephones connected to the telephone line has the handset lifted,
2. any of the PCIP equipped telephones has the handset lifted and the relay 310 has the phone connected to the house phone wires, or
3. any other equipment on the phone line such as a FAX or answering machine "picks up" a call.

Tone generator 368 is to able to convert a telephone number to be dialed from a computer based representation, such as binary, into DTMF (dual tone multifrequency) tones that can be superimposed onto the telephone line to affect autodialing. This circuit is related to PCIP capabilities other than Broadcast Caller ID and will not be discussed further here.

Ring detect circuit 362, Caller ID detect circuit 364, Off-hook detect circuit 366 are known to the person skilled in the art. Thus, they will not be described in greater detail. The functions of CODEC processor 344 and tone generator 368 can be flexibly programmed into various digital signal processors (DSPs) available in the industry, an example of which is DSP 1634 processor made by AT&T.

It should be noted that, in the embodiment shown in FIG. 3A, the three frequencies that are used to implement the communication and control channels in the PCIP system are out of the audio voice band and are in compliance with FCC rules, such that, the signaling of these three channels does not interface with normal communication and signaling on a telephone network, even when PCIP and normal telephone activities are in progress simultaneously.

In the embodiment as shown in FIG. 3A, a communication channel between adapter 102A and PCIPL board 142 is formed by: PCIPA communication channel circuitry 316, PCIPA high frequency interface circuitry 320, house phone wire 101, PCIPL high frequency interface circuitry 352, PCIPL communication channel circuitry 348. A control channel between adapter 102A and PCIPL board 142 is formed by: PCIPA control channel circuitry 318, PCIPA high frequency interface circuitry 320, house phone wire 101, PCIPL high frequency interface circuitry 352, PCIPL control channel circuitry 350.

Unlike the conventional telephone communication system, the present invention uses two communication channels to achieve full duplex audio. In the conventional telephone communication, one set of wires achieves full duplex audio by using a hybrid transformer that separates transmitting from receiving in a telephone set. However, the method used in the conventional telephone communication is not feasible when audio is modulated in an out of voice band carrier, because, if both ends of a communication channel used the same carrier, the result would be scrambled unrecoverable carrier.

In addition, unlike the conventional telephone communication system where a telephone office is usually either in audio transmission mode or in controlling mode (such as on-hook or off-hook signaling), the features provided by the adapters and PCIPL board 342 sometimes need to process audio transmission and control signals at the same time when multiple telephone sets connected to the telephone line are in use at the same time. Thus, in adapter 102A and PCIPL board 142, the communication channels are separated from the control channel.

In the embodiment shown in FIG. 3A, the existing house telephone wiring is used as transmission medium for the three high frequency channels between the adapter 102A and PCIPL board 142. However, other transmission media can be used to implement these three channels, such as wireless or power line carrier.

Referring to FIG. 3D (including 3E and 3F), there is shown another embodiment of the PC interactive phone (PCIP) system of FIG. 1 in greater detail, in accordance with the present invention.

Figure 3F:
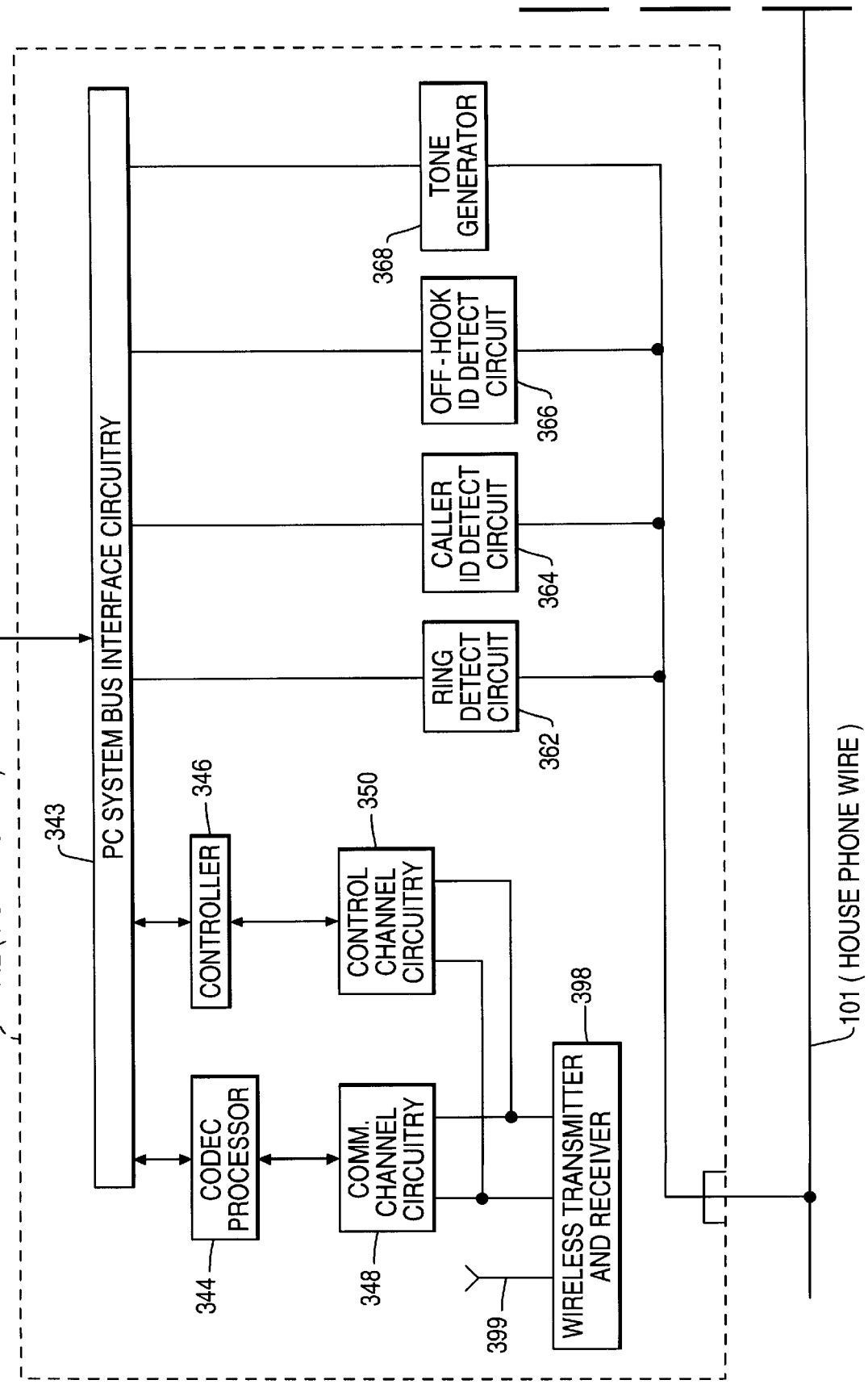

FIG. 3E has the similar structure to that as shown in FIG. 3B, except that in FIG. 3E high frequency interface circuitry 320 of FIG. 3B is replaced by wireless communication interface circuitry 396, which includes an antenna 397. FIG. 3F has the similar structure to that shown in FIG. 3C, except that in FIG. 3F high frequency interface circuitry 352 of FIG. 3B is replaced by wireless communication interface circuitry 398, which includes an antenna 399. Thus, in FIG. 3D, only PCIPA wireless communication interface circuitry 396 and PCIPL wireless communication interface circuitry 398 will be further described.

Wireless communication interface circuitry 396 (or 398) is able to implement a duplex communication link using two frequencies between any two PCIPAs or between one PCIPA and the PCIPL, and is able to implement a multipoint control channel on a third frequency. The communication link technology is common in the industry, as in cordless phone technology. However, specific control must be exerted to prevent more than one transmitter at a time on one frequency. The multi-point control link is implemented as a single frequency that is modulated "on" or "off" for Manchester encoded signaling by any of the PCIPL or PCIPA circuits. Multi-point networking is possible because each PCIPL and PCIPA circuit implements a collision detect and back-off algorithm as in the wired approach.

In the embodiment as shown in FIG. 3D, the communication between adapter 102A and PCIPL board 142 is through wireless carrier, instead of house telephone line 101. In FIG. 3D, a communication channel between adapter 102A and PCIPL board 142 is formed by: PCIPA communication channel circuitry 316, PCIPA wireless communication interface circuitry 396, PCIPL wireless communication interface circuitry 398, and PCIPL communication channel circuitry 348. A control channel between adapter 102A and PCIPL board 142 is formed by: PCIPA control channel circuitry 318, PCIPA wireless communication interface circuitry 396, PCIPL wireless communication interface circuitry 398, and PCIPL control channel circuitry 350. Like PCIP adapter 102A, each of the other PCIP adapters (102B, . . . , 102N) also has a communication channel and a control channel to PCIPL board 142.

Referring to FIG. 4, there is shown user panel 329 (which is mounted on the front of adapter box 202A) in greater detail, in accordance with the present invention.

As shown in FIG. 4, user panel 329 includes a speaker opening 402, two LEDs (404, 406), and two buttons (408, 410). LED 404, which is associated with the label "PC" and button 408, indicates whether a communications link has been established between the attached telephone set and PCIP speech recognition software 604 (see FIG. 6) at PC 141, as would be the typical case after pressing button 408. LED 406, which is associated with the label "LINE" and button 410, indicates whether telephone set 104A is directly connected to telephone line 101, as would be the typical case after pressing button 410.

In the idle state, PC 141 is on; PCIPL board 142 is active; and relay 310 connects telephone set 104A to SLIC 312; so that when picking up the handset of telephone set 104A, LED 404 typically turns on and a user can speak service request to PC 141 immediately without speaking over a dialtone sound. By pressing button 410, the user can override the default condition, which causes relay 310 to connect telephone set 104A to the telephone line directly and enables the user to dial a telephone number manually. Relay 310 is controlled by PCIP control program 602 (see FIG. 6) and the firmware in controller 314, which are responsive to button pushes, off-hook conditions, system state, and resource availability, such as availability of the audio communication channels. Some functions of PCIP control program 602 are distributed such that some control is in the various PCIP adapters (e.g. 102A–N). If PC 141 is turned off or otherwise not responding, controller 314 will control relay 310 to directly connect telephone set 104A to telephone line 101.

Figure 5:
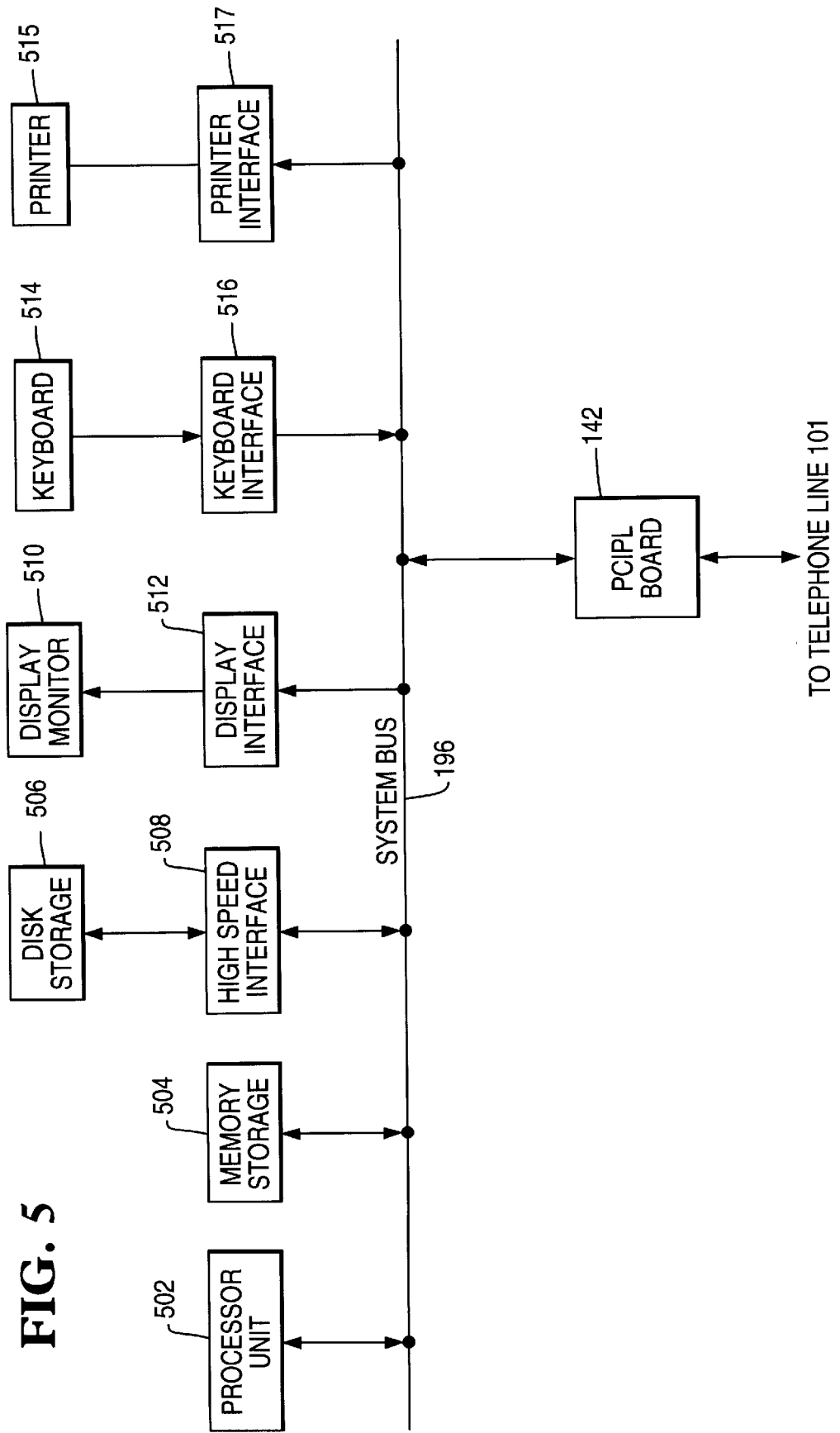
FIG. 5 shows a PC computer that can be used to control the operation of the PCIP system of FIG. 1, in accordance with the present invention.

Referring to FIG. 5, there is shown PC computer 141 of FIG. 1 in greater detail, in accordance with the present invention.

As shown in FIG. 5, PC 141 includes a system bus 196, a processor unit 502, a memory storage 504, a disk storage 506, a high speed interface 508, a display monitor 510, a display interface 512, a keyboard 514, a keyboard interface 516, a printer 515, and a printer interface 517.

Memory storage 504, coupled to the system bus, is able to store programs that consist of instructions and data.

Disk storage 506, coupled to the system bus via high speed interface 508, is also able to store programs. However, disk storage 506 has larger memory size than memory storage 504, while memory storage 504 has faster access speed than disk storage 506. The programs stored in disk storage 506 can be down loaded to memory storage 504.

Processor unit 502, coupled to the system bus, has the access to both memory storage 504 and disk storage 506. To perform a specific task, the processor unit is able to execute the programs stored in memory storage 504. The processor unit is also able to control the over all operation of the PC computer.

Display monitor 510, coupled to the bus via display interface 512, is able to provide visual interface between a user and the PC computer.

Keyboard 514, coupled to the system bus via a keyboard interface 516, is able to provide alphabetical and numerical input to the PC computer system.

Printer 515, coupled the system bus via printer interface 517, is able to print out results.

Figure 6:
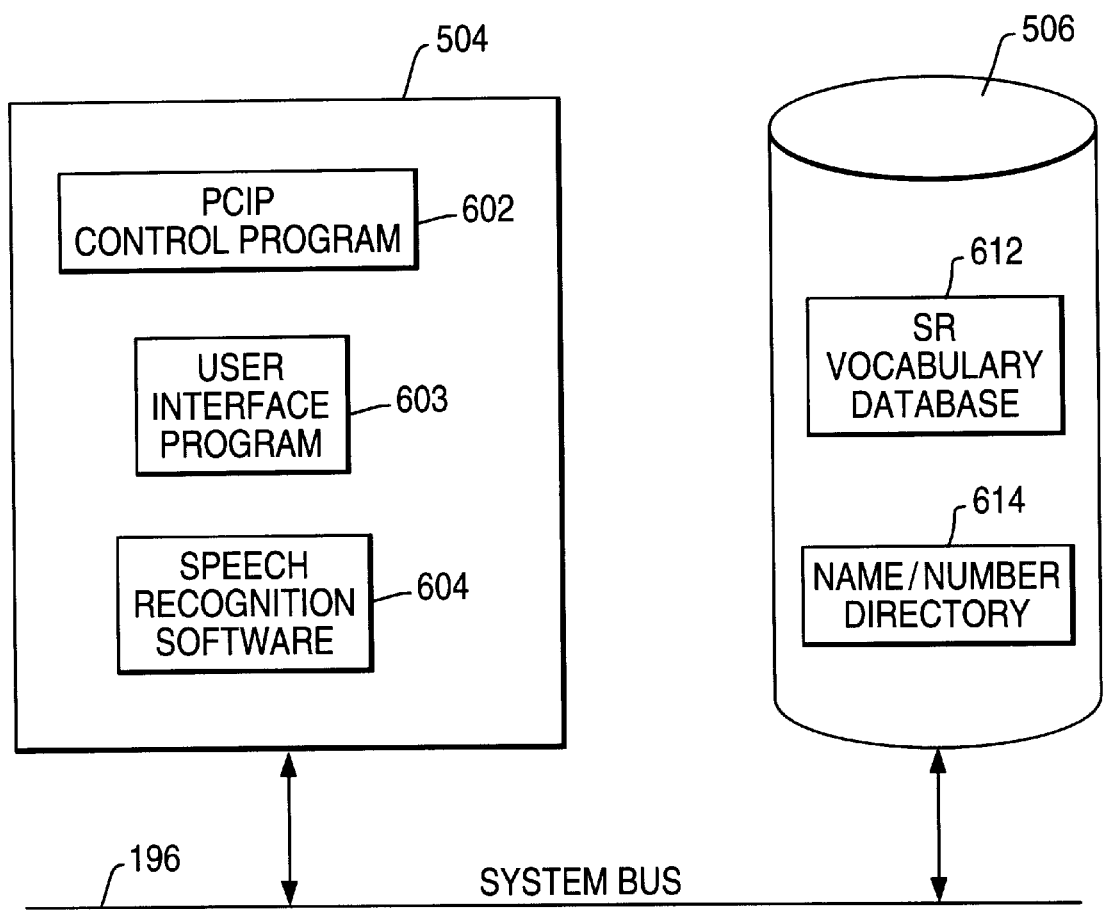
FIG. 6 shows the programs stored in memory storage and disk storage in FIG. 5.

Referring to FIG. 6, there is shown the executable programs stored in memory storage 504 during execution and the database files maintained in disk storage 506.

As shown in FIG. 6, executable programs stored in memory storage 504 include: PCIP control program 602, user interface program 603, and speech recognition software 604. Database files stored in disk storage 506 include: speech recognition (SR) vocabulary 612, and Name/Number directory 614.

PCIP control program 612 is able to maintain state information for the system and orchestrate responses to various stimulus. Stimulus's include button pushes, off-hooks, ring detect, etc. Responses include initiating database lookups, sending out control commands for establishing communication connections, etc. For example, if a PCIP adapter connected telephone has an off hook condition, control program 602 will be informed and it will send out commands on the control channel which will establish a communication channel. Furthermore, the control program will initiate speech recognition software 604 to "listen" to the appropriate communication channel. Specific examples are provided in the discussion of the flowcharts below.

Speech recognition software 604 is widely available. The PCIP system in the present invention does not require a particularly sophisticated capability. An example of an ASR application is WILDFIRE (call 800.WILDFIR for a practical demonstration and additional information). Examples of how speech recognition software 604 is used in this system are provided in the discussion of the flowcharts below.

SR Vocabulary 612 contains the digital representation of audio clips (in this case, spoken words relating to commands and names) that can be interpreted by speech recognition software 604. These digital representations are frequently referred to as wavefiles. The use of wavefile formats is common in the industry.

User interface program 603 provides a human interface via PC's display monitor 510, keyboard 514 and mouse 515. It allows a user to install, configure, and customize his/her PCIP system. This is a typical capability for PC add-in software and hardware and will not be discussed further.

The Name/Number directory 614 stores persons' names and associated telephone numbers.

The databases and data in disk storage 506 can be read into memory storage 504, updated in the memory storage 504, and written back to disk storage 506.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

What is claimed is:

1. A telephone system for providing a telephony feature, comprising a phone system controller and a first telephone system interface, wherein:

said first telephone system interface is (a) coupled between a first telephone handset and a telephone line, and (b) operable to (i) selectively couple said first telephone handset to said telephone line, (ii) provide a wireless control channel that is operable to carry first control signals associated with said telephony feature to said phone system controller, (iii) provide a wireless communication channel that is operable to carry voice signals of said first telephone handset to said phone system controller, and (iv) couple said first telephone handset to said telephone line in response to receiving a second control signal from said phone system controller via said wireless control channel, and said phone system controller comprises a personal computer system having telephony support, said phone system controller operable to (i) receive said first control signals via said wireless control channel and said voice signals via said wireless communication channel, (ii) process said first control signals and said voice signals to provide said telephony feature, and (iii) transfer said second control signals to said first telephony system interface via said wireless communication channel in response to processing said first control signals and said voice signals.

2. The telephone system of claim 1, wherein:

said phone system controller is coupled to said telephone line and is further operable to execute said telephony feature by applying signals to said telephone line.

3. The telephone system of claim 1, further comprising a second telephone system interface coupled between a second telephone handset and said telephone line, said second telephone system interface operable to (i) selectively couple said second telephone handset to said telephone line, and (ii) utilize said wireless control channel to carry second control signals associated with said telephony feature to said phone system controller, wherein:

said phone system controller is operable to (i) receive said second control signals via said wireless control channel, and (ii) process said second control signals to provide said telephony feature.

4. The telephone system of claim 1, further comprising a second telephone system interface coupled between a second telephone handset and said telephone line, said second telephone system interface operable to (i) selectively couple said second telephone handset to said telephone line, (ii) utilize said wireless control channel to carry second control signals associated with said telephony feature to said first telephone system interface, and (iii) provide a wireless communication channel that is operable to carry voice signals of said second telephone handset to said first telephone system interface, wherein:

said first telephone system interface is further operable to (i) receive said voice signals of said second telephone system via said wireless communication channel, and (ii) provide said voice signals to said first telephone handset.

* * * * *